US010229397B2

(12) United States Patent
Lee et al.

(10) Patent No.: US 10,229,397 B2
(45) Date of Patent: Mar. 12, 2019

(54) NEAR FIELD COMMUNICATION TERMINAL CAPABLE OF LOADING CARD WITH MONEY AND METHOD OF OPERATING THE SAME

(75) Inventors: Dong Hyuk Lee, Seongnam-si (KR); Jin Woo Kim, Uiwang-si (KR); Jun Su Yeo, Seongnam-si (KR)

(73) Assignee: KT Corporation, Seongnam-si (KR)

(*) Notice: Subject to any disclaimer, the term of this patent is extended or adjusted under 35 U.S.C. 154(b) by 723 days.

(21) Appl. No.: 13/252,442

(22) Filed: Oct. 4, 2011

(65) Prior Publication Data

US 2012/0089513 A1    Apr. 12, 2012

(30) Foreign Application Priority Data

Oct. 4, 2010  (KR) .................. 10-2010-0096462

(51) Int. Cl.
  *G06Q 20/10*   (2012.01)
  *G06Q 40/02*   (2012.01)
(52) U.S. Cl.
  CPC ........... *G06Q 20/10* (2013.01); *G06Q 20/105* (2013.01); *G06Q 40/02* (2013.01)
(58) Field of Classification Search
  CPC .. G06Q 20/32; G06Q 20/3278; G06Q 20/363; G06Q 20/40; G07F 7/0866; H04M 15/00
  USPC .................................................. 705/50–500
  See application file for complete search history.

(56) References Cited

U.S. PATENT DOCUMENTS

| | | | | |
|---|---|---|---|---|
| 6,250,557 B1* | 6/2001 | Forslund | ............ | G06K 17/0022 235/375 |
| 6,434,403 B1* | 8/2002 | Ausems | ................ | G06F 1/1626 455/556.2 |
| 7,140,549 B2* | 11/2006 | de Jong | ............... | G06Q 20/341 235/492 |
| 7,545,383 B2* | 6/2009 | Morita | .................. | G06F 3/0488 345/156 |
| 7,874,482 B2* | 1/2011 | Mitschele | ...................... | 235/384 |
| 7,950,576 B2* | 5/2011 | Triplett | .......................... | 705/17 |
| 8,111,144 B2* | 2/2012 | Kirkup | .................. | G06F 1/1626 340/13.25 |
| 8,496,169 B2* | 7/2013 | Christofferson | ........ | G06Q 10/02 235/375 |
| 8,938,793 B2* | 1/2015 | Ausems | ............. | G06Q 20/0453 713/153 |
| 2003/0121967 A1* | 7/2003 | Goldberg | ............... | G06Q 20/04 235/375 |
| 2004/0127256 A1* | 7/2004 | Goldthwaite | ........ | G06K 7/0004 455/558 |
| 2004/0172359 A1* | 9/2004 | Nakamura | ............. | G06Q 20/02 705/39 |
| 2006/0287004 A1* | 12/2006 | Fuqua | ................ | G06Q 20/0658 455/558 |

(Continued)

FOREIGN PATENT DOCUMENTS

KR       100922436 B1    10/2009

*Primary Examiner* — Calvin L Hewitt, II
*Assistant Examiner* — Sima Asgari
(74) *Attorney, Agent, or Firm* — Sughrue Mion, PLLC

(57) ABSTRACT

Disclosed herein are an NFC terminal and a method of operating an NFC terminal. The NFC terminal includes an NFC unit and a payment unit. The NFC unit communicates with an external payment processing server. The payment unit pays for loaded money data while communicating with the payment processing server.

8 Claims, 4 Drawing Sheets

(56) References Cited

U.S. PATENT DOCUMENTS

| | | | |
|---|---|---|---|
| 2009/0164322 A1* | 6/2009 | Khan | G06Q 20/105 |
| | | | 705/14.14 |
| 2010/0088188 A1* | 4/2010 | Kumar | G06Q 20/10 |
| | | | 705/17 |
| 2010/0222021 A1* | 9/2010 | Balsan | G06Q 20/18 |
| | | | 455/406 |
| 2010/0224681 A1* | 9/2010 | Triplett | G06Q 20/10 |
| | | | 235/380 |
| 2011/0087610 A1* | 4/2011 | Batada | G06F 21/72 |
| | | | 705/318 |

* cited by examiner

NEAR FIELD COMMUNICATION TERMINAL CAPABLE OF LOADING CARD WITH MONEY AND METHOD OF OPERATING THE SAME

BACKGROUND OF THE INVENTION

1. Field of the Invention

The present invention relates generally to a mobile terminal and, more particularly, to a Near Field Communication (NFC) terminal capable of conveniently loading a card with money, and a method of operating the NFC terminal.

2. Description of the Related Art

In general, plastic prepaid reloadable transportation cards can be loaded with money using offline loading machines installed at bus stops or subway stations, or can be loaded with money online using readers.

Prepaid reloadable transportation cards are loaded with money using loading machines that are distributed by transportation card service providers (e.g., T-money, and Mybi). Accordingly, users who frequently load cards with money or who are far away from transportation card loading machines are inconvenienced because they have to visit the places where transportation card loading machines have been installed. In the case of the online loading method, a reader should be utilized, and therefore users are inconvenienced when they load cards with money online.

SUMMARY OF THE INVENTION

Accordingly, an embodiment of the present invention has been made keeping in mind the above problems occurring in the prior art, and its object is to provide an NFC terminal in which a loading application has been installed and application and write functionality has been provided, thereby enabling a desired amount of money to be loaded into a non-contact prepaid card, and a method of operating the NFC terminal.

In order to accomplish the above object, an embodiment of the present invention provides an NFC terminal, including an NFC unit for communicating with an external payment processing server; and a payment unit for paying for loaded money data while communicating with the payment processing server.

The NFC terminal may further include a control unit for controlling operation of the NFC unit and operation of the payment unit and performing control so that the loaded money data received via the NFC unit and processed by the payment processing server can be stored in storage.

In order to accomplish the above object, an embodiment of the present invention provides a method of operating an NFC terminal, including the steps of (a) a control unit requesting an external payment processing server to pay for loaded money data using a payment verification number via an NFC unit; (b) in response to the payment request, the payment processing server processing the loaded money data and sending the processed loaded money data to the NFC unit; and (c) the control unit performing control so that the paid loaded money data can be stored in storage.

Furthermore, the step (a) may include operating the control unit in response to pressing of a loading button or performing control in response to a pressing of a loading button and money loading adjustment buttons so that an amount of money to be loaded can be adjusted.

And the method may further include (d) a user pressing a loading button to load a non-contact prepaid card with money; and (e) the control unit sending the stored loaded money data to the non-contact prepaid card via the NFC unit.

In order to accomplish the above object, an embodiment of the present invention provides a method of operating an NFC terminal, including the steps of (a) a user pressing a loading button to load a non-contact prepaid card with money; and (b) a control unit sending loaded money data to the non-contact prepaid card via an NFC unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
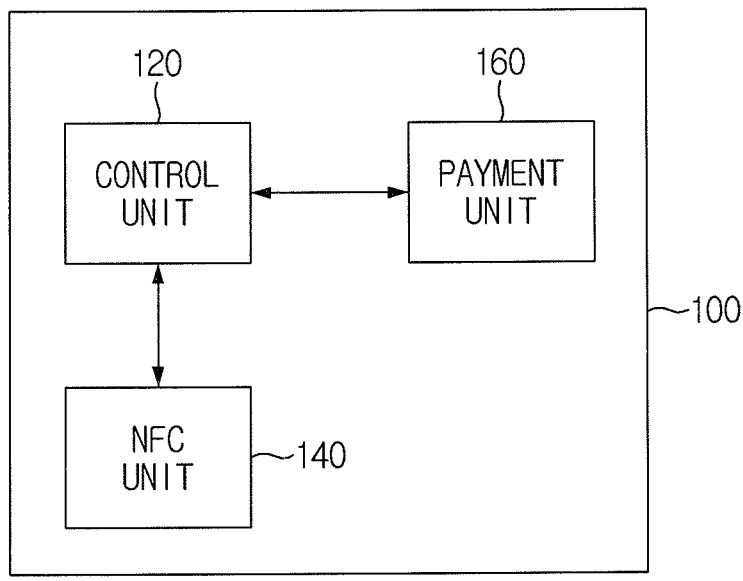
FIG. 1 is a block diagram illustrating an NFC terminal according to an embodiment of the present invention.

Reference now should be made to the drawings, in which the same reference numerals are used throughout the different drawings to designate the same or similar components.

FIG. 1 is a block diagram illustrating an NFC terminal 100 according to an embodiment of the present invention.

Referring to FIG. 1, the NFC terminal 100 includes a control unit 120, an NFC unit 140, and a payment unit 160. The NFC terminal 100 further includes a battery which supplies power. The NFC technology which is used in the present invention may be the technology which was disclosed in IEEE 14443A, 15693, Mifare, etc., and the frequency for radio frequency identification (RFID) which is used in the present invention may be, for example, 900 MHz or 13.56 MHz. NFC is a type of mobile RFID, and is technology that enables communications between devices. When a mobile phone equipped with NFC technology is brought into contact with a payment device, authentication and payment can be performed.

The NFC unit 140 may include a Radio Frequency (RF) antenna and an NFC chip (an NFC module) which are used to perform NFC. The NFC unit 140 may communicate with an external payment processing server to perform loading with money. The payment processing server may be a card payment settlement server that is installed in a company that manages smart cards such as T-money cards. The card payment settlement server may enable a user to transfer money while interworking with a server which manages the accounts of a bank or a credit card company to which the user subscribed. The NFC unit 140 may communicate with the payment processing server, for example, via an Access Point (AP) or a base station over the wireless Internet or the wired Internet.

The payment unit 160 pays for loaded money data while communicating with the payment processing server. The payment unit 160 includes flash memory which stores credit card information such as a payment verification number.

The payment unit 160 is equipped with a Universal Subscriber Identity Module (USIM), which is a security module. The USIM is configured such that a Subscriber Identity Module (SIM) card that stores subscriber information is combined with a Universal IC Card (UICC), and enables a variety of types of functionality, such as user authentication, global roaming, and e-commerce, to be implemented in a single card. Such a USIM may be mounted in a third-generation mobile communication (WCDMA) terminal.

The NFC terminal 100 may further include the control unit 120 which performs the functionality of a Central Processing Unit (CPU). The control unit 120 is equipped with loading application software, and performs the following operations.

The control unit 120 controls the operation of the NFC unit 140 and the operation of the payment unit 160, and performs control such that paid loaded money data which is received via the NFC unit 140 is stored in its internal storage unit or in a separate storage unit provided in the NFC terminal 100. The operation of the payment unit 160 means an operation performed to manage a payment verification number.

The storage unit in the control unit or the separate storage unit in the NFC terminal 100 may store loaded money data which enables money to be loaded into an RFID card such as a non-contact prepaid card. The RFID card may be, for example, a T-money smart card which is also used as a transportation card. The non-contact prepaid card may be of a plastic card type or an accessory type.

The NFC terminal according to the present invention further includes components that perform the functionality of a mobile phone or a personal digital assistant (PDA), in addition to the above-described components, thereby being used as a mobile phone or a PDA as well.

Figure 2:
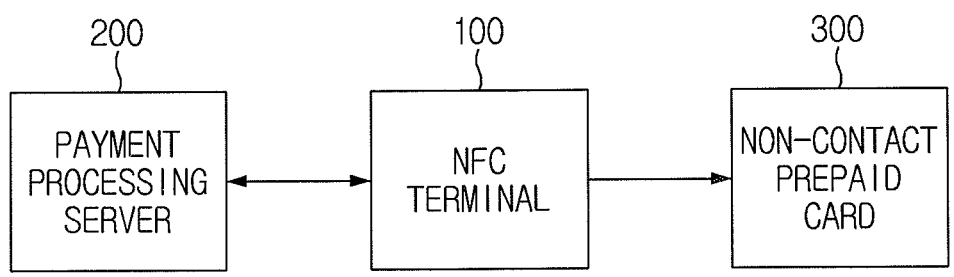
FIG. 2 is a block diagram illustrating the interworking between the NFC terminal of the present invention and a payment processing server or the interworking between the NFC terminal and a non-contact prepaid card.
Figure 3:
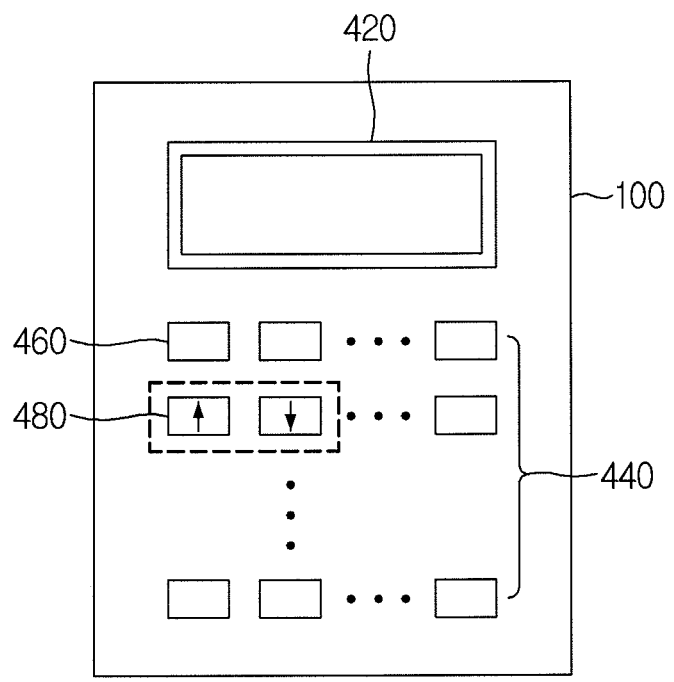
FIG. 3 is a diagram illustrating the exterior configuration of the NFC terminal according to an embodiment of the present invention.

Referring to FIGS. 1, 2 and 3, an example of the operation of the NFC terminal 100 will now be described. FIG. 2 is a block diagram illustrating the interworking between the NFC terminal 100 of the present invention and the payment processing server 200 or the interworking between the NFC terminal 100 and the non-contact prepaid card 300. Furthermore, FIG. 3 is a diagram illustrating the exterior configuration of the NFC terminal 100 according to an embodiment of the present invention.

First, the interworking between the NFC terminal 100 and the payment processing server 200 will now be described. The control unit 120 requests the external payment processing server 200 to pay for loaded money data using credit card information, stored in the payment unit, via the NFC unit 140 over the wireless Internet or the wired Internet network. The payment processing server 200 may be referred to as the "card payment settlement server," "service server," or "web server."

In response to the payment request, the payment processing server 200 withdraws money corresponding to the loaded money data from the credit card account of the user of the NFC terminal 100, and the payment processing server 200 sends the paid loaded money data to the NFC unit 140. In this case, the payment processing server 200 receives, verifies and approves the USIM information of the payment unit 160 which is sent via the NFC unit 140.

Next, referring to FIG. 3, the interworking (and/or connection) between the buttons of the NFC terminal 100 and the control unit 120 will now be described.

Referring to FIG. 3, the NFC terminal 100 according to an embodiment of the present invention may include a Liquid Crystal Display (LCD) screen 420 and functional keypads 440 on the top thereof. The LCD screen 420 displays a screen corresponding to each of the functional keypads 440. The functional keypads 440 may include a loading button 460 and money loading adjustment buttons 480. The money loading adjustment buttons 480 are buttons that are used to adjust the amount of money to be loaded after the loading button 460 has been pressed, and include an increment key and a decrement key. The functional keypads 440 may further include the buttons of a mobile phone or a PDA.

The loading button 460 is configured to interwork with the control unit (120 of FIG. 1). Accordingly, when the loading button 460 is pressed, the control unit 120 operates.

When the loading button 460 is pressed and then the money loading adjustment buttons 480 are selectively pressed, the amount of money to be loaded is adjusted by the control unit 120. The adjustment of the amount of money to be loaded can be facilitated by referring to the information displayed on the LCD screen 420.

In another embodiment of the present invention, it may be possible to adjust the amount of money to be loaded using only the loading button 460 by means of separate application software.

Referring to FIGS. 1, 2 and 3, the interworking (operation) between the NFC terminal 100 and the non-contact prepaid card 300 will now be described. The non-contact prepaid card 300 may contain an RF antenna and an RFID chip and perform the functionality of an RFID tag.

When the user of the NFC terminal 100 presses the loading button (460 of FIG. 3) to load the non-contact prepaid card 300 with money, the control unit 120 sends paid loaded money data to the non-contact prepaid card 300 via the NFC unit 140. Then the non-contact prepaid card 300 may be used, for example, as a transportation card.

When the loading button 460 is pressed and then the money loading adjustment buttons 480 are selectively pressed, the amount of money to be loaded is adjusted by the control unit 120. The adjustment of the amount of money to be loaded can be facilitated by referring to the information displayed on the LCD screen 420.

The operation of the NFC terminal 100 is performed using the write functionality of the NFC terminal 100.

Figure 4:
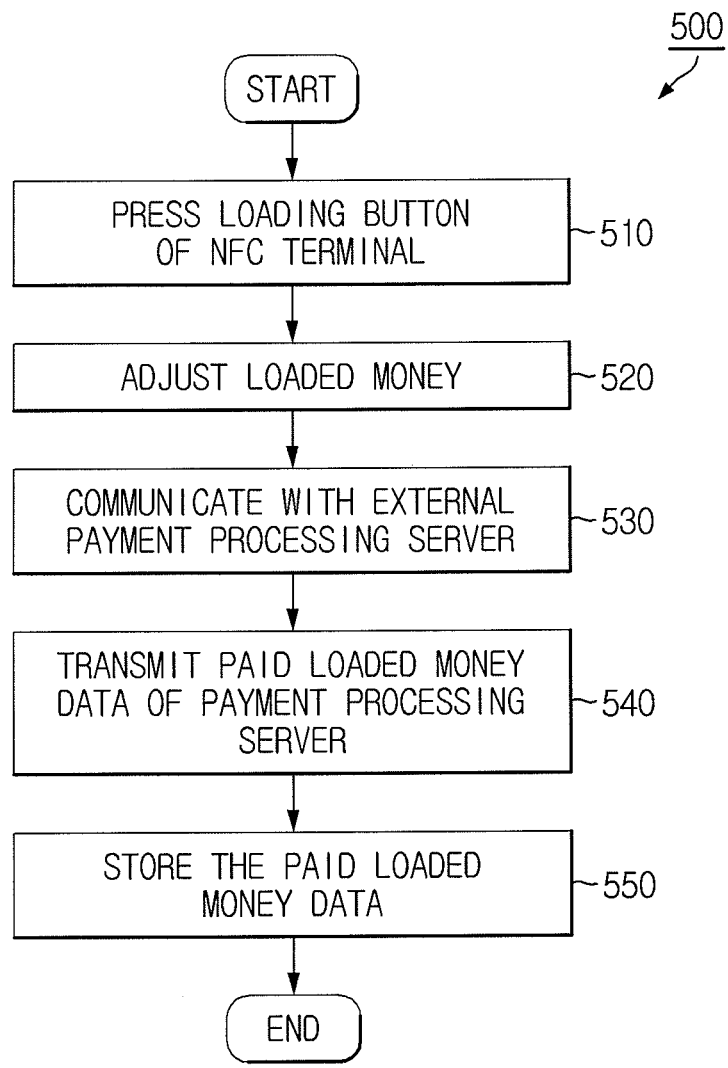
FIG. 4 is a flowchart illustrating a method of operating the NFC terminal according to an embodiment of the present invention.

FIG. 4 is a flowchart illustrating a method 500 of operating the NFC terminal according to an embodiment of the present invention. The method 500 of operating the NFC terminal may be applied to the NFC terminal 100 shown in FIG. 1.

Referring to FIG. 4, at pressing step 510, the loading button of the NFC terminal is pressed by the user.

At adjustment step 520, the user may control the operation of the control unit of the NFC terminal using the loading button and the money loading adjustment buttons so as to adjust the amount of money to be loaded. In another embodiment of the present invention, adjustment step 520 may be omitted from the process of the method 500 of operating the NFC terminal.

At communication step 530, when the loading button is pressed, the NFC unit of the NFC terminal communicates with the external payment processing server. In greater detail, the external payment processing server is requested to pay for loaded money data by the control unit of the NFC terminal.

At transmission step 540, in response to the payment request, the payment processing server verifies and approves the authentication number of the user, withdraws money corresponding to the loaded money data from the user's account, and then sends paid loaded money data to the NFC unit.

At storage step 550, the control unit performs control so that the paid loaded money data is stored in the control unit's own storage unit or in a separate storage unit.

Figure 5:
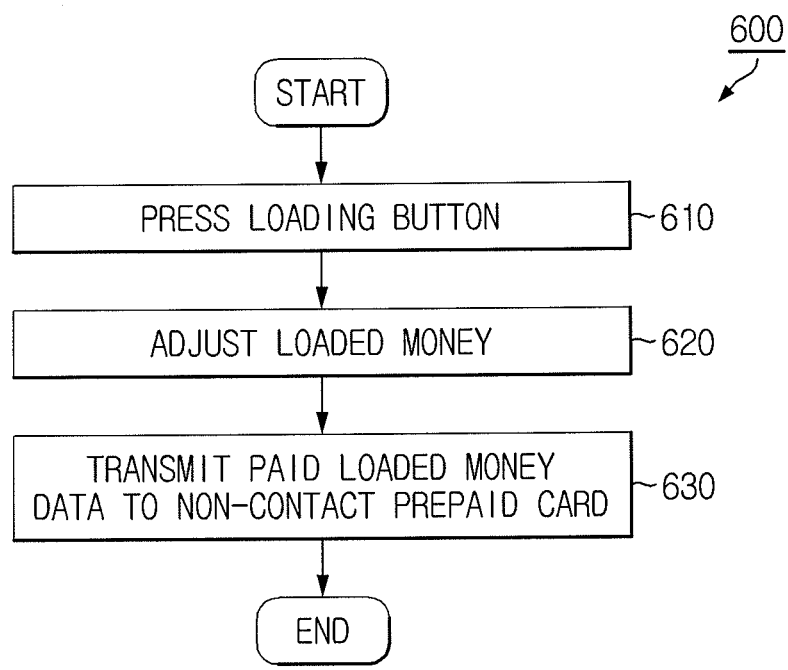
FIG. 5 is a flowchart illustrating a method of operating the NFC terminal according to another embodiment of the present invention.

FIG. 5 is a flowchart illustrating a method 600 of operating the NFC terminal according to another embodiment of the present invention. The method 600 of operating the NFC terminal may be applied to the NFC terminal 100 shown in FIG. 1.

Referring to FIG. 5, at pressing step 610, the loading button of the NFC terminal is pressed by the user.

At adjustment step 620, the user may control the operation of the control unit of the NFC terminal using the loading button and the money loading adjustment buttons so as to adjust the amount of money to be loaded. In still another embodiment of the present invention, adjustment step 620 may be omitted from the process of the method 600 of operating the NFC terminal.

At transmission step 630, the control unit of the NFC terminal sends paid data about loaded money, which is processed by the payment processing server, to the non-contact prepaid card via the NFC unit. Then the loaded money data is stored in the non-contact prepaid card, and therefore the user can pay transportation fares using the non-contact prepaid card and an RF reader installed in a subway station or a bus.

In still another embodiment of the present invention, the method 500 of operating the NFC terminal illustrated in FIG. 4 may be combined with the method 600 of operating the NFC terminal illustrated in FIG. 5.

Since the NFC terminal and the method of operating the NFC terminal according to the present invention make use of a mounted NFC unit such as an NFC chip, the user can directly and conveniently load the desired amount of money onto a non-contact prepaid card, which is an RFID card, using his or her own NFC terminal. Since the NFC terminal and the method of operating the NFC terminal according to the present invention make use of the mounted payment unit that allows credit cards, such as a USIM, to be used to make payments, the inconvenience of the input of a card number during payment and erroneous input can be eliminated, and card information can be prevented from being divulged to another person, thereby enhancing the security of personal information. Accordingly, the present invention does not require a reader, unlike the conventional online loading scheme.

Moreover, since the NFC terminal and the method of operating the NFC terminal according to the present invention enables the user's own NFC terminal to be directly utilized, the service of loading money into the non-contact prepaid card can be easily provided without spatial and temporal limitations.

As a result, the present invention can offer an advanced service which is capable of accelerating the trend towards convergence devices in which a purse and an RFID reader/writer have been incorporated into a single device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A Near Field Communication (NFC) terminal, comprising:
   an NFC unit which communicates with an external payment processing server;
   a payment unit which stores universal subscriber identity module information and credit card information of a user;
   a memory;
   a control unit, which:
   receives the credit card information and the universal subscriber identity module information, from the payment unit;
   sends the credit card information, the universal subscriber identity module information, and a request for money data, via the NFC unit, to the external payment processing server;
   receives the money data from the external payment processing server via the NFC unit;
   stores the money data in the memory; and
   transfers the money data from the memory to a card via the NFC unit.

2. The NFC terminal as set forth in claim 1, wherein the control unit further:
   transfers the money data from the memory to a transportation card via near field communication by the NFC unit.

3. The NFC terminal as set forth in claim 1, wherein the universal subscriber identity module information includes a payment verification number, and wherein the control unit further:
   requests the external payment processing server for the money data using the payment verification number.

4. The NFC terminal as set forth in claim 1, further comprising a loading button, which receives a user command, wherein the control unit further:
   receives the user command from the loading button; and
   requests the external payment processing server for the money data, based on the user command.

5. The NFC terminal as set forth in claim 4, further comprising a loading adjustment button, which receives an adjustment input from the user, wherein the control unit further:
   receives the adjustment input from the adjustment button; and
   requests the external payment processing server for the money data, based on the adjustment input.

6. A method of operating a Near Field Communication (NFC) terminal, comprising:
   storing, by a payment unit of the NFC terminal, universal subscriber identity module information and credit card information of a user;
   receiving, by a control unit of the NFC terminal, the credit card information and the universal subscriber identity module information, from the payment unit;
   sending, by the control unit, the credit card information, the universal subscriber identity module information, and a request for money data, via an NFC unit, to an external payment processing server;
   receiving, by the control unit, the money data from the external payment processing server via the NFC unit;
   storing, by the control unit, the money data in a memory; and
   transferring, by the control unit, the money data from the memory to a card via the NFC unit.

7. The method as set forth in claim 6, further comprising:
receiving, by a loading button of the NFC terminal, a user command;
receiving, by the control unit, the user command from the loading button; and
requesting, by the control unit, the external payment processing server for the money data, based on the user command.

8. The method as set forth in claim 6, further comprising:
receiving, by a loading adjustment button of the NFC terminal, an adjustment input from the user;
receiving, by the control unit, the adjustment input from the adjustment button; and
requesting, by the control unit, the external payment processing server for the money data, based on the adjustment input.

* * * * *